United States Patent

[11] 3,603,303

| [72] | Inventor | James R. Stouffer<br>Ithaca, N.Y. |
|---|---|---|
| [21] | Appl. No. | 765,918 |
| [22] | Filed | Oct. 8, 1968 |
| [45] | Patented | Sept. 7, 1971 |
| [73] | Assignee | Cornell Research Foundation, Inc.<br>Ithaca, N.Y. |

[54] SONIC INSPECTION METHOD AND APPARATUS
15 Claims, 7 Drawing Figs.

[52] U.S. Cl. .................................................. 128/2 R,
73/67.8 S, 73/71.5
[51] Int. Cl. ....................................................... A61b 10/00
[50] Field of Search ........................................... 73/67.5,
67.6, 67.7, 67.8; 128/2

[56] References Cited
UNITED STATES PATENTS
| 3,356,086 | 12/1967 | Behney | 128/24 |
|---|---|---|---|
| 3,480,002 | 11/1969 | Flaherty et al. | 128/2 |
| 3,496,764 | 12/1970 | Stouffer | 73/67.8 |
| 2,593,865 | 4/1952 | Erdman | 73/67.8 |
| 2,903,617 | 9/1959 | Turner | 315/12 |
| 2,919,574 | 1/1960 | Fotland | 73/67.6 |
| 3,315,521 | 4/1967 | Ostrofsky et al. | 73/67.8 X |
| 3,371,660 | 3/1968 | Carlin | 73/67.8 X |

*Primary Examiner*—Richard C. Queisser
*Assistant Examiner*—Arthur E. Korkosz
*Attorneys*—Lawrence E. Laubscher and Ralph R. Barnard ABSTRACT: The sonic inspection method and apparatus includes the use of a thin walled receptacle having a low resistance to the transmission of sonic waves to contain the body to be inspected and a fluid having acoustical properties corresponding to those of the body. A sonic transducer is acoustically coupled to the exterior of the receptacle to transmit sonic waves to the body and receive the reflected waves therefrom.

INVENTOR
James R. Stouffer

BY Lawrence E. Laubscher
ATTORNEY

INVENTOR
James R. Stouffer

BY Lawrence E. Laubscher
ATTORNEY

INVENTOR
James R. Stouffer

BY Lawrence C. Laubscher
ATTORNEY

SONIC INSPECTION METHOD AND APPARATUS

SPECIFICATION

The use of ultrasonic techniques and apparatus for examining the tissue structure of humans and animals is well known, and numerous devices have been developed to accomplish sonic inspection. However, there has always been a problem of maintaining contact of a sonic transducer head with a subject under evaluation in order to achieve optimum efficiency of transmission of sound waves into the subject and return thereof to the transducer.

In the past, various techniques for coupling a sonic transducer to the subject under inspection have been employed. In some cases, the transducer head has been directly applied to the subject as illustrated in my copending application, Ser. No. 626,333 now U.S. Pat. No. 3,496,704 "Sonic Inspection Apparatus." Often, direct contact between the subject and transducer head is avoided by immersing the subject in a coupling fluid with the transducer head also immersed in the fluid but spaced from the subject. This form of coupling is illustrated by the U.S. Pat. No. 2,885,887 to Henysz and Von Ardenne U.S. Pat No. 3,309,655.

The prior methods for coupling a sonic transducer to a subject under inspection give rise to definite disadvantages, particularly when the subject is a living human. The use of a sonic transducer either in direct contact with the human body or present in the fluid immersing portions of the body often causes apprehension and discomfort. Also, controlled movement of the transducer along a definite, mechanically controlled path is difficult under these conditions.

More important, however, than the adverse psychological effects resulting from the use of prior sonic inspection devices are the disadvantages inherent in such devices which have caused poor resolution in the resultant output obtained. The basic problems occuring with prior sonic inspection units employing the immersion technique often result from corrosion, buoyancy and size or geometry.

The immersion of a sonic transducer with accompanying electrical and mechanical control and guiding units in a couplant solution inherently results in system maintenance problems, for the couplant solution causes corrosion and deterioration of system components. Also, the necessity to fit both the transducer system and the subject within a liquid container imposes severe limitations on the geometry of the transducer system which often require the sacrifice of resolution. The result is generally a rather massive, ponderous unit.

Buoyancy of the subject is a major deterrant to resolution in immersion systems. The volume of couplant required to provide adequate acoustic coupling between an immersed transducer and subject also imposes buoyant forces which tend to move the subject during the inspection process. Movement of the subject destroys the resolution of the sonic display.

Buoyant forces on the subject may be eliminated by enclosing the couplant solution in a separate container and placing the container against the surface of the subject. However, it has been found that this solution is achieved only by sacrificing much of the resolution which was hopefully to be gained by the elimination of buoyancy, for the container wall forms an interface next to the subject which destroys near field resolution.

The primary object of the present invention is to provide a novel and improved sonic inspection method and apparatus for effectively coupling a remote sonic transducer to a body to be inspected.

Another object of the present invention is to provide a novel and improved sonic inspection method and apparatus for effectively coupling a movably mounted sonic transducer to a body to be inspected without requiring contact between the body and the transducer head or the transducer head and a coupling fluid contacting the body.

A further object of the present invention is to provide a novel and improved sonic inspection method and apparatus for achieving an effective sonic couple between a specimen surface of irregular contour and a sonic transducer without imposing buoyant forces on the specimen.

A still further object of the invention is to provide a novel and improved sonic inspection apparatus for achieving an effective sonic couple between a specimen surface within a container and a sonic transducer without sacrificing near field resolution or imposing buoyant forces on the specimen.

Other objects and advantages of the invention will become apparent from a study of the following specification when considered in conjunction with the accompanying drawings, in which.

Figure 1:
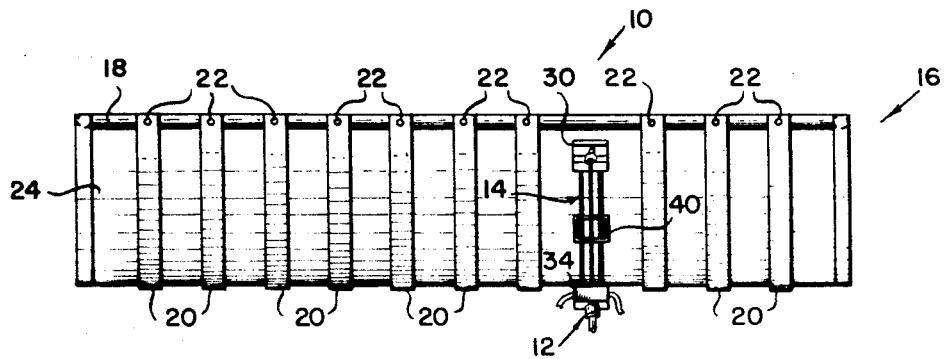
FIG. 1 is a view in side elevation of the sonic inspection apparatus.
Figure 2:
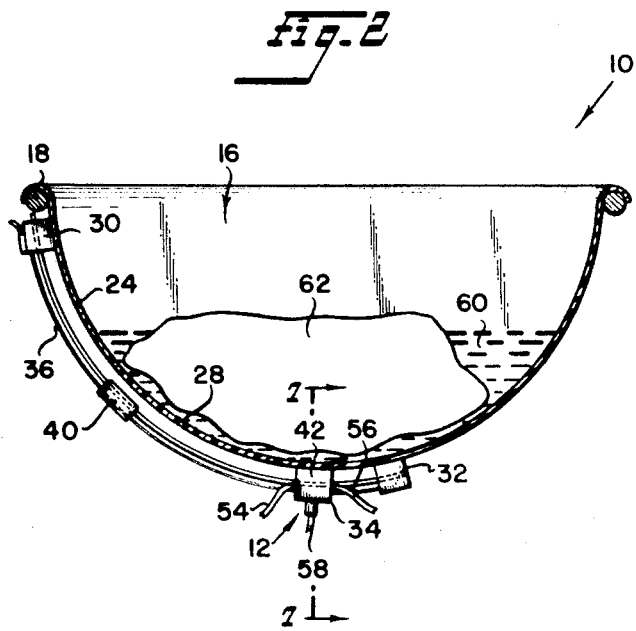
FIG. 2 is a generally diagrammatic transverse sectional illustration of the sonic inspection apparatus.

The method for sonic inspection of the present invention permits a sonic transducer to be mounted for controlled movement free of the body under inspection or the fluid contacting the body. In accomplishing this method, a thin sheet of material is interposed between the subject under inspection and the sonic transducer-receiver employed to direct sonic waves to the subject and receive the waves reflected therefrom. This sheet, which constitutes the wall of a receptacle, must be formed of a material which operates substantially as a "window" to transmitted and reflected sound waves in the ultrasonic frequency range. Although a number of materials may be suited for this purpose, polyethylene formed to a sheet thickness within the range of from 10 mils to two-tenths inches has been found to have a low resistance to the passage of ultrasonic waves. For example, 15 mil inserts sold under the trademark "Hedliner" (Reg.) have been effectively employed. Also, a thin sheet of atabrine rubber has similar properties.

The sheet or liner forming the receptacle may be flexible or semiflexible so that it will substantially conform to the shape of the transducer guide. The guide conforms to the overall shape of the subject under inspection. All spaces between the sheet and the surface under inspection must then be filled with couplant fluid, and a layer of liquid must be maintained between the surface of the receptacle and the subject. However this liquid layer does not subject the subject to appreciable buoyant forces, and it is now possible to record precisely the surface of the subject and the subsequent reflecting surfaces within the subject in true and correct position. This recording may be achieved with a sonic transducer coupled to the exterior of the receptacle.

It must be noted that receptacle wall does not directly contact the surface of the subject which is under examination, and therefore does not form an interface adjacent to this surface which destroys near field resolution. In perfecting sonic inspection techniques, it has been noted that an area of poor resolution exists in the immediate vicinity of the sonic transducer, and the transducer must be spaced from the subject under examination. This spacing is variable depending on the characteristics of a specific transducer, but for example only, might be in the area of approximately one-half inches.

In the present invention, the receptacle wall is positioned in the area of poor resolution while the area of ultimate resolution adjacent the surface of the inspected body is filled with couplant fluid which does not form an interface.

For accurate recording, it is often preferable that the fluid within the receptacle have substantially the same acoustic properties as the tissue or subject under evaluation. For example, tissue from humans or animals generally has the same acoustic properties as a 27-33 percent saturated salt solution at a temperature very near body temperature (95° F.-100° F.).

Although a number of sonic inspection assemblies might be employed to accomplish the method of the present invention, the novel sonic inspection apparatus 10 in the accompanying drawings is particularly well adapted for this purpose. Referring now to the drawings, the sonic inspection apparatus includes a transducer assembly 12 which is mounted for movement along a transducer guide 14. The transducer guide is positioned to adapt the transducer assembly for movement about a specimen support 16.

The specimen support 16 is formed by a rigid rectangular frame 18 having a plurality of flexible supporting webs 20 looped between opposite sides thereof. These webs constitute a plurality of elongated flexible strands, the opposed ends of each strand being connected by suitable connections 22 to opposite sides of the frame 18. These connections should permit removal of the webs from the frame.

A thin layer 24 is inserted in the frame 18 and is supported by the strands 20 to provide a fluid container. This liner is formed from sheet material having a low resistance to the passage of ultrasonic waves, and may constitute a sheet of atabrine rubber or a sheet of polyethylene of a sheet thickness within the range of from 10 mils to two-tenths inches.

The transducer guide 14 forms part of the specimen support 16 and operates in a manner similar to the webs 20 in providing support for the liner 24. In fact, the transducer guide normally replaces a web 20 which is unsnapped at 22 and dropped to provide space for the transducer guide. The transducer guide 14 and transducer assembly 12 are adapted for use with the sonic inspection apparatus illustrated in detail in my copending application Ser. No. 626,333, now U.S. Pat. No. 3,496,704 and only the portions of this apparatus directly concerned with the present invention are illustrated herein.

Figure 3:
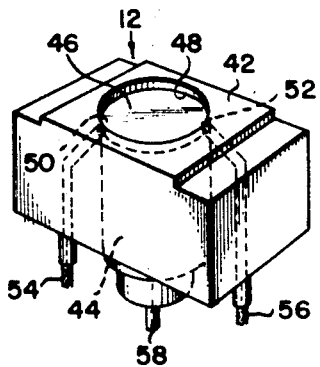
FIG. 3 is a perspective view of the sonic transducer assembly for the apparatus of FIG. 1.
Figure 4:
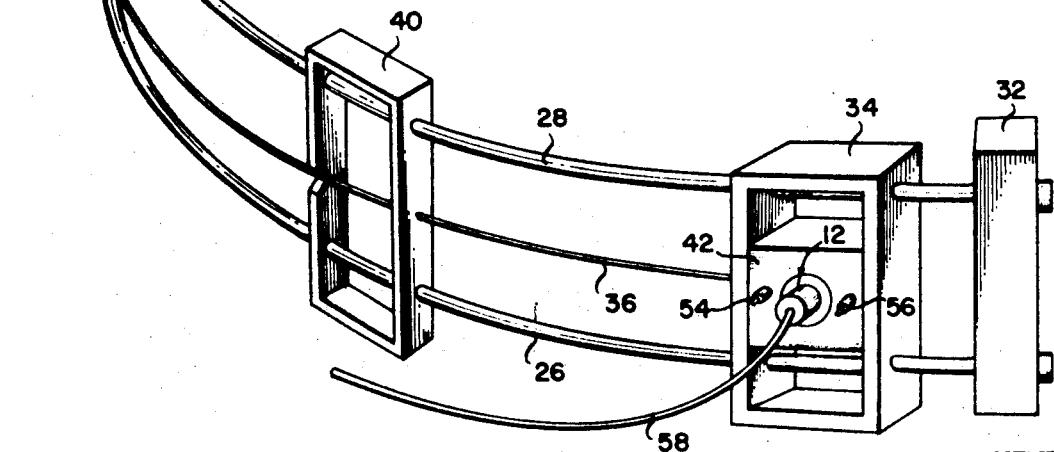
FIG. 4 illustrates transducer guide means for the transducer assembly.

Referring particularly to FIGS. 3 and 4, the transducer guide assembly 14 includes a pair of spaced, parallel guide rods 26 and 28; the ends of which are rigidly connected with supporting blocks 30 and 32 which seat against the liner 24. The transducer assembly 12 is carried by a slide block 34 that is mounted for sliding movement upon the guide rods and is activated by means of the inner wire 36 of a cable 38. Preferably an intermediate support block 40 is slidably mounted on the guide rods to stabilize the intermediate portion thereof and also to support the wire 36.

The transducer assembly 12 includes a block transducer holder 42 mounted on the slide block 34 for supporting an ultrasonic transducer receiver 44. The transducer head 46 of the transducer receiver is recessed within a couplant chamber 48 formed in the transducer holder, and this chamber is provided with a couplant inlet port 50 and a couplant outlet port 52. Couplant is supplied to the inlet port by an inlet line 54 and removed at the outlet port by an outlet line 56. The lines 54 and 56 are connected to a suitable couplant source (not shown) of a known type which operates too circulate couplant through the couplant chamber.

The transducer 44 is connected by conductors 58 with a conventional sonic range unit for transmitting and receiving sonic energy into and from a specimen. Examples of the range unit and transducer are the SONORAY Ultrasonic Animal tester Model 12 and type Zs Ultrasonic transducer marketed by Branson Instruments Inc., Stamford, Conn.

The inspection apparatus 10 is completed by a fluid 60 which is placed into the liner 24 to form a liquid layer between the liner and the surfaces of a specimen 62 to be examined. This fluid preferably should have acoustical properties corresponding to those of the specimen as previously described.

OPERATION

In the operation of the inspection apparatus 10, the specimen 62 is placed within the liner 24 and the fluid 60 is added. If the liner is somewhat flexible, the flexible supporting strands 20 permit the liner to conform generally to the shape of the transducer guide assembly 14. Also, the guide rods 26 and 28 are to correspond to the contour of the specimen.

The transducer guide rods 26 and 28 permit the block transducer holder to be moved about the specimen 62 in contact with the exterior of the liner 24. The couplant within the couplant chamber 48 couples the transducer head 46 to the liner so that a continuous path for sonic waves to and from the specimen is maintained. This couplant may constitute any suitable known sonic couplant, such as for example, paraffin oil or mineral oil.

When the transducer assembly is activated, sonic waves pass to and from the specimen 62 through the couplant in the couplant chamber 48, the liner 24 and the fluid 60, and never through the atmosphere. The fluid 60 fills the spaces between the liner and the surface of the specimen without imparting buoyancy to the specimen.

Figure 7:
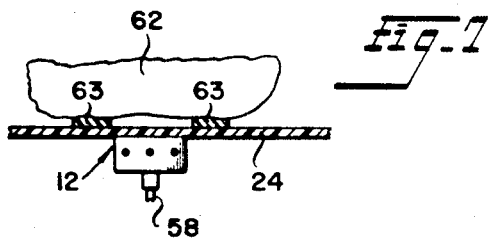
FIG. 7 is a sectional view taken along lines 7—7 of FIG. 2.

As previously indicated, it is necessary to maintain the liner 24 in an area of poor resolution with respect to the transducer 44 while the specimen 62 is spaced from the transducer so as to be positioned in an area of good resolution. This relative spacing can be achieved by a number of different methods, one of which is illustrated in FIG. 7. In FIG. 7, a pair of spaced support strips 63 of rubber or similar material are placed against the inner surface of the liner 24. These support strips extend substantially parallel to the path taken by the transducer assembly 12 as determined by the transducer guide assembly 14 and are spaced on either side of this path so as not to interfere with the passage of sonic waves between the transducer and the specimen. These support strips are dimensioned to maintain the liner is spaced relationship with the specimen so that the liner is always positioned in the area of poor resolution. Obviously the thickness of these support strips can be varied to alter the relationship between the transducer, the liner and the specimen.

EMBODIMENTS

Figure 5:
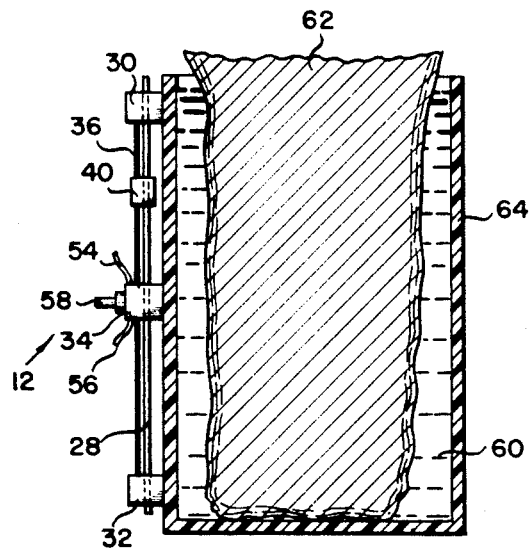
FIG. 5 is a diagrammatic illustration of a first embodiment of the sonic inspection apparatus.

The configuration of the specimen support 16 and transducer guide 14 may be altered to adapt the sonic inspection apparatus 10 for a variety of measuring applications. As illustrated in FIG. 5, a rigid receptacle 64 having straight rather than curved sides may be employed to receive the specimen 62. Like the liner 24, the receptacle 64 is formed from thin sheet material having a low resistance to the passage of ultrasonic waves. However, the receptacle 64 is self supporting and the frame 18 and webs 20 are eliminated.

The transducer guide 14 of FIG. 5 is no longer curved as in FIG. 1, but instead is adapted to guide the transducer assembly 12 in a straight line along one of the sides of the receptacle 64. In all other respects, the inspection apparatus of FIG. 5 operates in the manner previously described in connection with FIG. 1-4 and 7.

For certain applications, it may be desirable to inspect only an appendage of a living human or animal and in such cases, it is not necessary to surround the subject with a supporting receptacle. Instead, a compact, portable sonic inspection apparatus designed to receive only the appendage to be examined may be used. The specimen receiving receptacle in a portable inspection unit is formed in conformance with the configuration of the specimen appendage, while the transducer guide is in turn formed to follow the outer surface of the receptacle.

Figure 6:
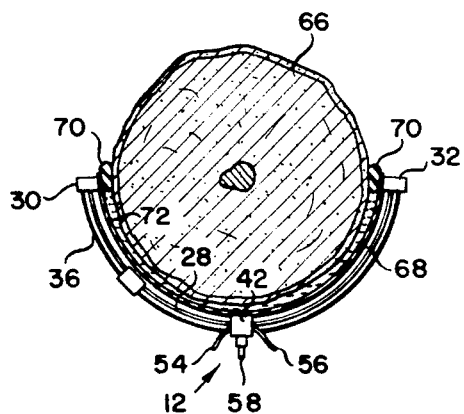
FIG. 6 is a diagrammatic illustration of a second embodiment of the sonic inspection apparatus.

In FIG. 6, a portable sonic inspection apparatus for examining an elongated, substantially circular appendage, such as a human arm or leg, is illustrated. The appendage 66 is inserted in a receptacle 68 which substantially conforms to the inspection surface, and as in the case of the receptacle 64, is formed from sheet material having a low resistance to the passage of sonic waves. The peripheral edges of the receptacle 64, including the edges of the front and rear walls thereof, not shown, are provided with a sealing gasket 70, if such is necessary to maintain a layer of couplant fluid 72 between the surface to be examined and the receptacle wall.

A curved transducer guide 14 similar to that illustrated in FIG. 4 is mounted on the outer surface of the receptacle 64 and may form the sole supporting frame therefor. The transducer assembly 12 is moved along the guide to perform an examination of the appendage 66 in the manner previously described.

In the units illustrated by both FIGS. 5 and 6, support pads spaced on either side of the transducer path in the manner illustrated by FIG. 7 may be employed to maintain the desired relative spacing between the transducer, the receptacle and the specimen.

While in accordance with the provisions of the Patent Statutes the preferred forms and embodiments of the invention have been illustrated and described, it will be apparent to those skilled in the art that changes may be made without deviating from the invention as set forth in the following claims.

1. An ultrasonic apparatus for examining an irregularly contoured body of human or animal matter comprising a receptacle for receiving said body and a layer of coupling fluid interposed between said body and receptacle, said receptacle being formed by a thin, flexible sheet having a low resistance to the transmission of sonic waves, support means for said receptacle to permit said receptacle to substantially conform to the contour of said body, said support means including a frame and a web of spaced, flexible strands suspended from said frame to receive and support said flexible sheet and transducer means mounted exteriorly of said receptacle and adjacent thereto for transmitting sound energy to said body and receiving sound energy reflected therefrom.

2. The ultrasonic apparatus of claim 1 wherein said transducer means includes a sonic transducer and transducer mounting means in contact with said receptacle to maintain said transducer spaced relative to said body and receptacle to maintain said receptacle in the area of poor resolution adjacent the transducer.

3. The ultrasonic apparatus of claim 1 wherein said support means includes transducer guide means for supporting said sheet and mounting said transducer means for movement in a path along the surface of said sheet, said transducer guide means including a pair of spaced end blocks adapted for seating engagement with the sheet, curved, flexible guide rod means extending between said end blocks in parallel spaced relationship; and transducer supporting means for supporting said transducer means for sliding engagement upon said guide rod means, and said transducer means includes a transducer holder mounted by said transducer supporting means for contact with said sheet, a transducer mounted within said holder and recessed from the contact point between said holder and sheet, and means to introduce a continuous supply of couplant into said holder between said transducer and sheet.

4. An ultrasonic apparatus for examining a body of human or animal matter, said body having an irregularly contoured surface in the area of the body to be examined, comprising receptacle means adapted to support said body, a small volume of sonic wave coupling fluid contained within said receptacle means of sufficient volume to form a layer of fluid between said receptacle means and the surface of said body in the area to be inspected without imparting substantial buoyancy to said body, said receptacle means including flexible material having a low resistance to the transmission of sonic waves and adapted to substantially conform to the contour of the surface of said body in the area to be inspected to permit the formation of a layer of coupling fluid between the surface of said body in the area of inspection and the surface of said flexible material of sufficient volume to preclude the destruction of near field resolution resulting from interaction between said flexible material and the surface of said body, sonic transducer means mounted exteriorly of said receptacle means and adjacent thereto for transmitting sound energy to said body through said flexible material and layer of coupling fluid and receiving sound energy reflected from said body, and transducer mounting means in contact with said flexible material and operative to maintain said transducer means spaced relative to said body and flexible material to maintain said flexible material in the area of poor resolution adjacent said transducer means.

5. The ultrasonic apparatus of claim 4 wherein said transducer mounting means includes transducer guide means in contact with said receptacle means for mounting said sonic transducer means for movement in a path along the surface of said receptacle means.

6. The ultrasonic apparatus of claim 5 wherein said transducer mounting means includes a transducer holder mounted on said guide means and in contact with said flexible material, said sonic transducer means being mounted in said holder and recessed from the contact point between said holder and flexible material, and means to introduce a continuous supply of couplant into said holder between said sonic transducer means and said flexible material.

7. The ultrasonic apparatus of claim 5 wherein said receptacle means is supported by said transducer guide means, said flexible material forming the walls of said receptacle means and being adapted to conform substantially to the contour of said body, said receptacle means including an opening contoured to receive only a section of an animal or human bearing the area to be inspected.

8. The ultrasonic apparatus of claim 7 wherein liquid sealing means are secured to said receptacle means adjacent the peripheral edges of said opening.

9. The ultrasonic apparatus of claim 4 which includes means for providing a couplant between said transducer means and said flexible material.

10. The ultrasonic apparatus of claim 4 wherein support means are provided to support said body in spaced relation to said flexible material to cause said coupling fluid to form a layer sufficient to preclude the destruction of near field resolution resulting from interaction between said body and flexible material.

11. A method for examining a body of human or animal matter by means of sonic energy which includes positioning a layer of material having a low resistance to the transmission of sonic waves between a source of sonic waves and said body, introducing a layer of couplant fluid having acoustical properties corresponding to those of said body between the body and said material layer, said couplant fluid constituting a 27 percent–33 percent saturated salt water solution brought to a temperature substantially equal to the temperature of said body, positioning said source of sonic waves relative to said body to place said material layer in the area of poor resolution adjacent said source, and directing a beam of sonic energy through said material layer and couplant fluid to said body and receiving energy reflected by said body.

12. A method for examining a body of human or animal matter by means of sonic energy, said body having an irregularly contoured surface in the area of the body to be examined, which includes substantially conforming a layer of flexible material having a low resistance to the transmission of sonic waves to the irregular contoured surface of said body in the area to be examined, containing a small volume of couplant fluid having acoustical properties corresponding substantially to those of said body within said layer of flexible material, said volume of couplant fluid being insufficient to exert substantial buoyant forces on said body, placing said body in said couplant fluid with said irregularly contoured surface adjacent the surface of said flexible material but spaced therefrom to cause the formation of a layer of couplant fluid therebetween sufficient to preclude the destruction of near field resolution resulting from interaction between said body and flexible material, positioning a source of sonic waves on the side of said flexible material opposite to said body and relative to said flexible material and body to place said flexible material in the area of poor resolution adjacent said source, and directing a beam of sonic energy through said flexible material and couplant fluid to said body and receiving energy reflected by said body.

13. The method according to claim 12 wherein said fluid couplant is maintained at a temperature substantially equal to the temperature of said body.

14. The method according to claim 12 wherein a sonic couplant is introduced between said source of sonic waves and said flexible material layer.

15. The method according to claim 14 wherein said fluid couplant constitutes a 27 percent–33 percent saturated salt water solution maintained at a temperature substantially equal to the temperature of said body.